United States Patent
Yitbarek et al.

(10) Patent No.: US 8,117,007 B2
(45) Date of Patent: Feb. 14, 2012

(54) STATISTICAL ANALYSIS FOR MAINTENANCE OPTIMIZATION

(75) Inventors: Anbessie A. Yitbarek, Renton, WA (US); I-Li Lu, Issaquah, WA (US); Ranjan K. Paul, Sammamish, WA (US); Farshad Dopulatshahi, Mercer Island, WA (US); Elizabeth A. Whalen, Seattle, WA (US); Shuying Zhu, Seattle, WA (US); Peter A. Fiddler, Seattle, WA (US)

(73) Assignee: The Boeing Company, Chicago, IL (US)

( * ) Notice: Subject to any disclaimer, the term of this patent is extended or adjusted under 35 U.S.C. 154(b) by 730 days.

(21) Appl. No.: 12/209,491

(22) Filed: Sep. 12, 2008

(65) Prior Publication Data

US 2010/0070237 A1 Mar. 18, 2010

(51) Int. Cl.
*G04F 5/00* (2006.01)

(52) U.S. Cl. .......... 702/177; 702/179; 701/30; 705/305

(58) Field of Classification Search .................. 702/177, 702/183–184, 179; 701/30; 705/305
See application file for complete search history.

(56) References Cited

U.S. PATENT DOCUMENTS

| 4,612,620 | A | 9/1986 | Davis et al. | |
|---|---|---|---|---|
| 7,024,291 | B2 | 4/2006 | Sudou | |
| 2008/0147264 | A1* | 6/2008 | Doulatshahi et al. | 701/30 |

OTHER PUBLICATIONS

Brown, "Bounds, Inequalities, and Monotonicity Properties for Some Specialized Renewal Processes", The Annals of Probability, vol. 8, No. 2, Apr. 1980, pp. 227-240 http://www.jstor.org/stable/2243267.

\* cited by examiner

*Primary Examiner* — Drew A Dunn
*Assistant Examiner* — Hien Vo
(74) *Attorney, Agent, or Firm* — Yee & Associates, P.C.

(57) ABSTRACT

A computer implemented method, apparatus, and computer program product for identifying an interval for performing a maintenance task. The process retrieves scheduled maintenance data and un-scheduled in-service maintenance data for a given apparatus type. The process maps the un-scheduled in-service maintenance data to the scheduled maintenance data for the given apparatus type to form mapped maintenance data. The process performs a statistical analysis on the mapped maintenance data. The process identifies an optimal interval for performing the maintenance task based on a result of the statistical analysis to form a recommended maintenance interval.

20 Claims, 8 Drawing Sheets

STATISTICAL ANALYSIS FOR MAINTENANCE OPTIMIZATION

BACKGROUND INFORMATION

1. Field

The present disclosure relates generally to an improved data processing system and in particular to a statistical analytical tool. Still more particularly, the present disclosure relates to a method and apparatus for performing statistical analysis on maintenance data to generate an optimized maintenance schedule.

2. Background

An apparatus, such as an aircraft, construction equipment, or an automobile, may periodically be taken out of service for the performance of scheduled maintenance on the apparatus. Maintenance is performed to ensure that all component parts are operating at peak efficiency and with optimal safety. Different maintenance tasks may need to be performed at different intervals than other maintenance tasks. For example, in an automobile, air filters may need to be checked and replaced more frequently than the tires or the timing belt. Therefore, different maintenance tasks are typically scheduled to occur at different intervals.

Engineers use design information and engineering knowledge, judgment, and manual engineering analysis to determine how frequently different maintenance tasks should be scheduled. For example, as part of instructions for continued airworthiness (ICA) requirements, aircraft engineers develop an initial scheduled maintenance program, also known as maintenance review board report (MRBR) or maintenance planning document (MPD). The process involves an industry sanctioned maintenance steering group (MSG-3) analysis to predict scheduled maintenance requirements for each aircraft model. Although MSG-3 is an industry proven tool, it provides virtually no guidance regarding maintenance interval determination. Current practice relies on aircraft engineering judgments and prudence dictates higher conservatism in scheduling frequency of maintenance.

The manual engineering analysis is typically performed using data from a limited number of operators to identify the appropriate frequency and scheduling of these maintenance tasks. Subsequent optimization of scheduled maintenance tasks is performed based on scheduled maintenance data gathered by participating operators during regular, out-of-service, scheduled maintenance. In addition, the scheduled maintenance data is not submitted in a consistent format and the submission of the scheduled maintenance data is also voluntary. In other words, subsequent optimization of maintenance tasks is determined based on scheduled maintenance data, which is largely limited to hangar maintenance findings.

SUMMARY

An embodiment of the present disclosure provides a computer implemented method, apparatus, and computer program product for identifying an interval for performing a maintenance task. The process retrieves scheduled maintenance data and un-scheduled in-service maintenance data for a given apparatus type. The process maps the un-scheduled in-service maintenance data to the scheduled maintenance data for the given apparatus type to form mapped maintenance data. The process performs a statistical analysis on the mapped maintenance data. The process identifies an optimal interval for performing the maintenance task based on a result of the statistical analysis to form a recommended maintenance interval.

The statistical analysis of un-scheduled in-service maintenance data with scheduled maintenance data permits optimized scheduling of maintenance tasks. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
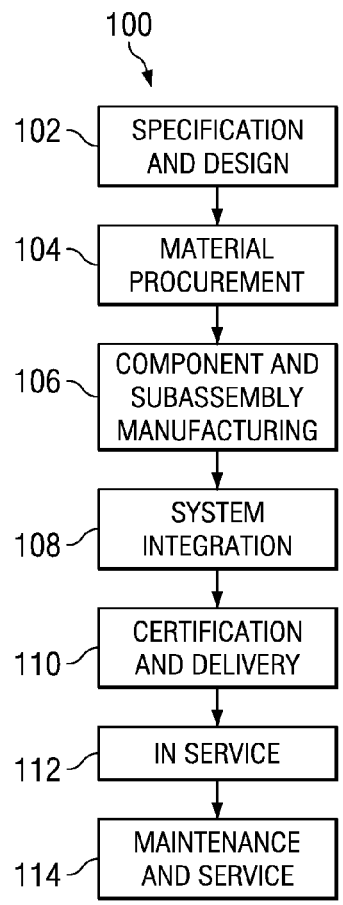
FIG. 1 is a diagram illustrating an aircraft manufacturing and service method depicted in accordance with an advantageous embodiment.
Figure 2:
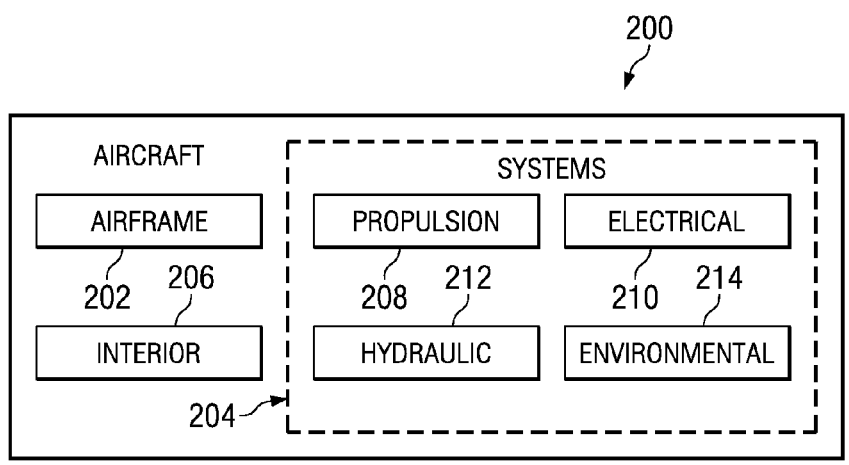
FIG. 2 is a diagram of an aircraft depicted in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

A maintenance task is a task associated with inspecting, maintaining, repairing, and/or replacing a component or subcomponent. Maintenance tasks to be performed on an apparatus are typically scheduled based on the review and analysis of scheduled maintenance data only. The analysis and review of maintenance data does not include line station and operational maintenance data. Moreover, the current analysis and review does not use any scientific method to evaluate and analyze in-service data. In addition, the format of the scheduled maintenance data may not be submitted in a consistent manner and the submission by operators may be voluntary. Thus, the current scheduling of maintenance data may be identified based on a limited scope of data that does not represent all aspects of aircraft maintenance events.

A maintenance event is any event that is associated with maintenance, repair, or replacement of a component of the apparatus. A maintenance event may include, without limitation, a functional part failure, a system failure, loss of function, decreased function, service interrupt, corrosion, wear, slow response time, decreased efficiency, decreased fuel efficiency, loss of tire pressure, or any other event that necessitates maintenance, repair, or replacement of a component or subpart of a component.

The advantageous embodiments recognize that optimization of maintenance task scheduling is currently performed by engineers using scheduled maintenance data with limited visibility to unscheduled maintenance events. Individual operators lack visibility of fleet-wide performance data, which may result in sub-optimized and non-standard maintenance scheduling programs. The advantageous embodiments recognize that this lack of ability to optimize scheduled maintenance programs in the most efficient manner may cause operators to perform non-value added maintenance which may be an unnecessary cost burden. In such cases, the current overly conservative scheduling of maintenance tasks may be cost ineffective and result in performance of unnecessary maintenance procedures. The unnecessary maintenance requirement may also increase aircraft down time which impacts availability of the aircraft or apparatus for revenue operation.

An advantageous embodiment of the present disclosure provides a computer implemented method, apparatus, and computer program product for identifying an interval for performing a maintenance task. The process retrieves scheduled maintenance data and un-scheduled in-service maintenance data for a given apparatus type. A given apparatus type is a type or model of a particular apparatus. For example, if an apparatus is an aircraft, the apparatus type may include all aircraft of a particular model number, such as a Boeing 787. An apparatus type may also include all aircraft having one or more characteristics in common, such as, without limitation, all cargo aircraft, all aircraft that use the same engine model, or any other characteristic. Thus, an apparatus type may include the same or similar types of apparatus.

The process maps the un-scheduled in-service maintenance data to the scheduled maintenance data for the given apparatus model to form mapped maintenance data. The process performs a statistical analysis on the mapped maintenance data. The process identifies an optimal interval for performing the maintenance task based on a result of the statistical analysis to form a recommended maintenance interval.

This statistical analysis on in-service maintenance events, in addition to scheduled maintenance events, minimizes the frequency of in-service maintenance events and improves aircraft dispatch with optimized scheduling of preventative scheduled maintenance tasks.

Figure 3:
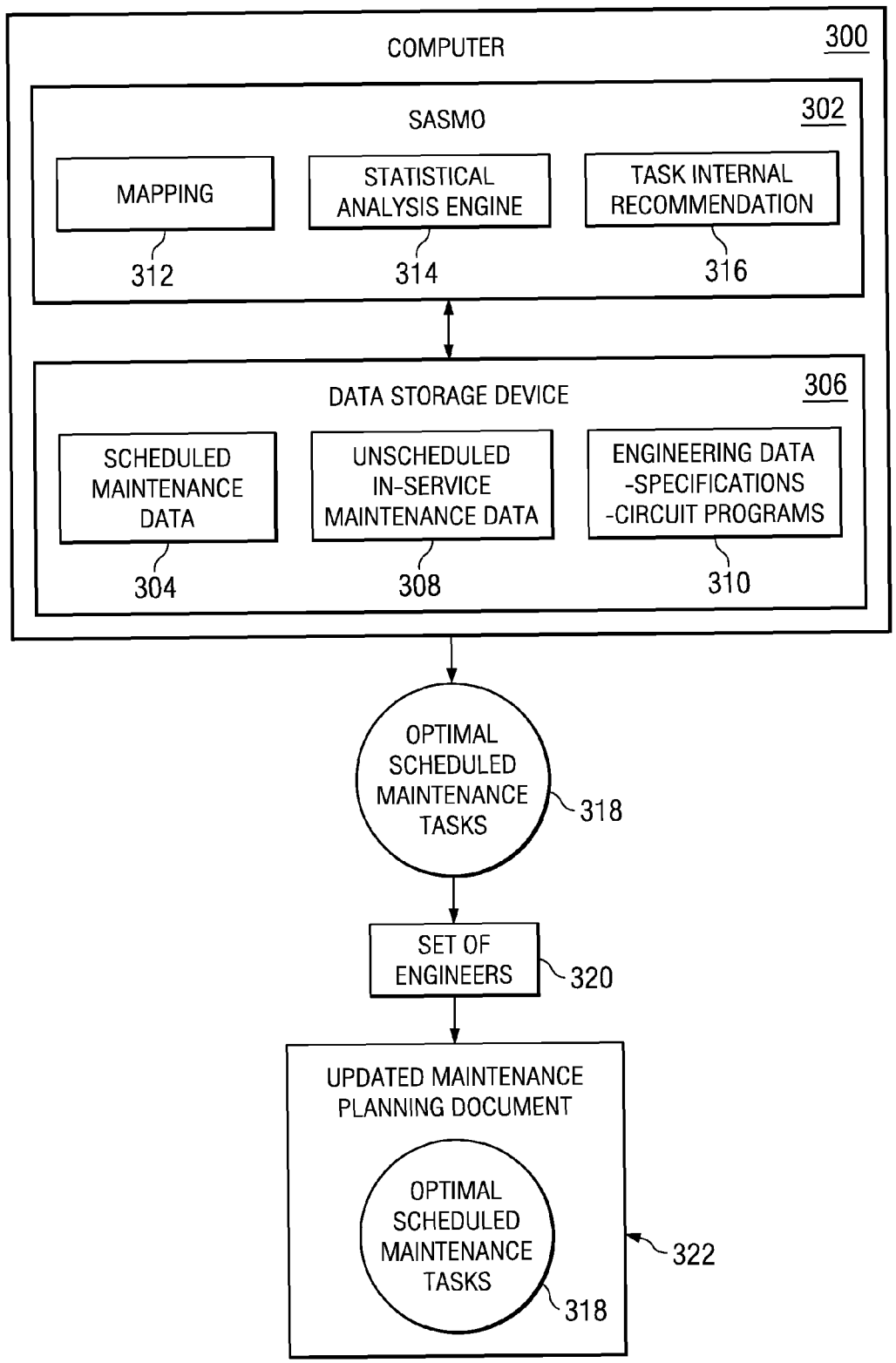
FIG. 3 is a block diagram of a statistical analysis scheduled maintenance optimization (SASMO) engine in accordance with an advantageous embodiment.

FIG. 3 is a block diagram of a statistical analysis scheduled maintenance optimization (SASMO) engine in accordance with an advantageous embodiment. Computer 300 may be implemented in any type of computing device, such as, without limitation, a laptop, a desktop computer, a personal digital assistant (PDA), a client computer, a server computer, a smart phone, or any other computing device.

Statistical analysis scheduled maintenance optimization engine (SASMO) 302 is a software statistical analysis tool that identifies an optimum interval requirement for scheduling maintenance on an apparatus. An apparatus is any machine or device that may require scheduled maintenance, such as, without limitation, an automobile, a truck, an aerospace vehicle, heavy equipment, construction equipment, a boat, a ship, a submarine, or an aircraft, such as aircraft 200 in FIG. 2. SASMO 302 performs statistical analysis on structured and formatted scheduled maintenance history data in scheduled maintenance data 304, aircraft in-service performance data in un-scheduled in-service maintenance data 308, and engineering data 310 in data storage device 306 to alert engineers on potential optimization opportunities and capabilities to perform trend and root cause analysis.

Data storage device 306 may be implemented as a hard drive, a flash memory, a main memory, read only memory (ROM), a random access memory (RAM), or any other type of data storage device. Data storage device 306 may be implemented in a single data storage device or a plurality of data storage devices. Data storage device 306 may include one or more databases. In one embodiment, SASMO 302 extracts un-scheduled in-service maintenance data 308 from a database, such as, for example and without limitation, the Boeing Airplane Reliability and Maintainability (ARMS) database.

Scheduled maintenance data 304 is scheduled maintenance history information describing the scheduled maintenance tasks and findings of scheduled maintenance tasks. Scheduled maintenance data 304 is stored on data storage device 306. Un-scheduled in-service maintenance data 308 comprises data elements describing un-scheduled maintenance events, such as, without limitation, aircraft line operation maintenance events. Scheduled maintenance data 304 and un-scheduled in-service maintenance data 308 may include, without limitation, component removal records, log book entries, delay and cancellation records, maintenance findings, part numbers of replaced parts, and other maintenance task information. Engineering data 310 is engineering information describing the apparatus, such as, without limitation, parts data, specifications, circuit diagrams, and any other engineering information that may be found in a technical manual for the apparatus.

SASMO 302 includes mapping 312. Mapping 312 is a software component that maps unscheduled in-service maintenance data 308 with scheduled maintenance data 304 and engineering data 310 to form mapped maintenance data. Mapped maintenance data is structured and formatted data. In one embodiment, mapping 312 includes a text mining tool for mapping log book entries and delay and cancellation records in scheduled maintenance data 304 and un-scheduled in-service maintenance data 308 to form the mapped maintenance data. A comprehensive dictionary of technical vocabulary, commonly used in the maintenance industry around the world, is developed to complement the text mining tool.

Statistical analysis engine 314 is a software component that performs statistical analysis on mapped maintenance data using scientific methods to evaluate and analyze in-service and out-of-service maintenance data in conjunction with engineering data 310 to identify an optimal interval for each maintenance task. Statistical analysis engine 314 may be implemented using known or available statistical application program, such as, but without limitation, statistical analysis software (SAS).

In one embodiment, statistical analysis engine 314 comprises a probability distribution model. Statistical analysis engine 314 uses multiple probability distribution models to analyze the risk of an anomaly manifesting in a given component or system and optimize maintenance task intervals. Statistical analysis engine 314 assumes that most components deteriorate with age. The first threshold maintenance interval and subsequent repeat maintenance intervals are determined separately. The first threshold maintenance interval is determined based on the risk of a first anomaly related to each task. Statistical analysis engine 314 identifies a repeat interval for subsequent maintenance based on subsequent maintenance events and subsequent anomaly occurrences.

Statistical analysis engine 314 identifies an optimal scheduled maintenance interval based on risk assessment of factors, such as, without limitation, the nature and criticality of the system under evaluation, the relevance and significance of inspection findings, the chance of capturing potential defects during scheduled maintenance, and the risk of decreased efficiency and increased incidents of in-service maintenance. Statistical analysis engine 314 applies a safe interval zone concept to optimize task intervals. A safe interval is dependent on the criticality of the system, the risk involved, the interrelationship and interdependence of other systems, and other factors. Statistical analysis engine 314 identifies maintenance intervals that minimize in-service maintenance events while maximizing the chance of identifying anomalies and potential anomalies during scheduled maintenance.

Task internal recommendation 316 outputs the results generated by statistical analysis engine 314 as optimal scheduled maintenance tasks 318 to set of engineers 320. The results comprise a recommended first threshold maintenance interval for the initial maintenance on the component and recommended subsequent repeating intervals.

In FIG. 3, scheduled maintenance data 304, describing scheduled maintenance events, are directly fed into statistical analysis engine 314. Un-scheduled in-service-maintenance data 308 describing in-service maintenance events are linked to scheduled maintenance tasks by mapping 312 prior to statistical analysis engine 314 performing the statistical analysis on the mapped maintenance data.

Set of engineers 320 is a set of one or more engineers. Set of engineers 320 evaluates optimal scheduled maintenance tasks 318 and generates updated maintenance planning document 322. Updated maintenance planning document (MPD) 322 is a document that comprises a recommended schedule for performing a plurality of maintenance tasks on a given apparatus type. Updated maintenance planning document 322 includes a change of maintenance practice or airline maintenance manual. Updated maintenance planning document 322 is sent to each operator of an apparatus of the given apparatus type for utilization in performing maintenance on the apparatus.

Thus, SASMO 302 manages and optimizes operator maintenance programs by capturing and analyzing all maintenance related data, including in-service and out-of-service maintenance data, such as reliability, operational, and maintenance performance information, to improve the efficiency of scheduled maintenance tasks and reduce the occurrence of un-scheduled maintenance tasks.

Figure 4:
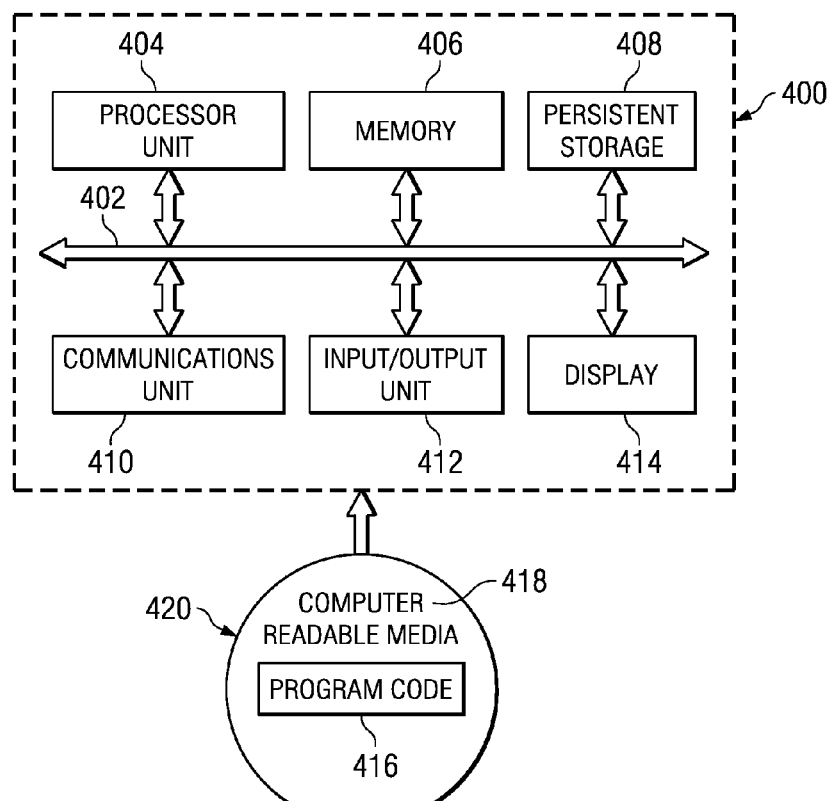
FIG. 4 is a diagram of a data processing system depicted in accordance with an advantageous embodiment.

Turning now to FIG. 4, a diagram of a data processing system is depicted in accordance with an illustrative embodiment. Data processing system 400 is an example of a data processing system that may be used to implement a statistical analysis scheduled maintenance optimization engine, such as computer 300 in FIG. 3.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip.

As another illustrative example, processor unit 404 may be a symmetric multi-processor system containing multiple processors of the same type.

Memory 406, in these examples, may be, for example, a random access memory or any other suitable volatile or non-volatile storage device. Persistent storage 408 may take various forms depending on the particular implementation. For example, persistent storage 408 may contain one or more components or devices, may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as, program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 may also take the form of a persistent storage, such as a hard drive or a flash memory that is connected to data processing system 400. The tangible form of computer readable media 418 is also referred to as computer recordable storage media.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communication links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

For example, a bus system may be used to implement communications fabric 404 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
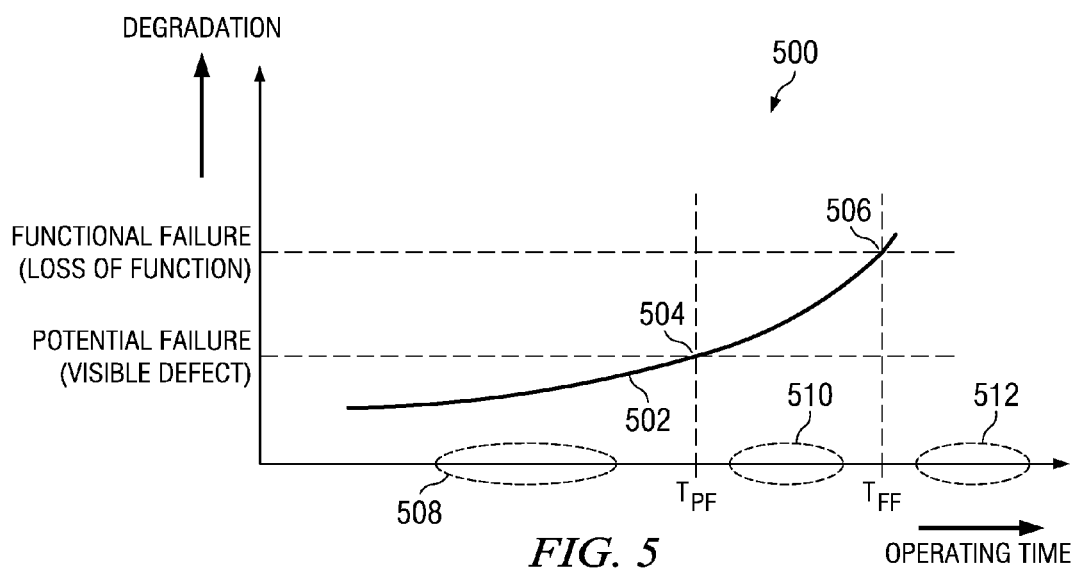
FIG. 5 is a graph illustrating an optimal time interval for scheduled maintenance tasks in accordance with an advantageous embodiment.

FIG. 5 is a graph illustrating an optimal time interval for scheduled maintenance tasks in accordance with an advantageous embodiment. According to MSG-3 analysis, each scheduled maintenance task is generated to detect anomalies and prevent potential future anomalies in certain maintenance significant items (MSI) and structural significant items (SSI). Graph 500 illustrates anomaly characteristics of a typical MSI or SSI. Line 502 shows anomaly on-set and manifestation in a component of a given apparatus over time. In general, preventative maintenance is performed to detect a potential anomaly before it manifests itself. The maintenance interval between performances of a particular maintenance task is set higher than the on-set point (TPF) 504 but well before it reaches the anomaly functional manifestation point 506 at which point the anomaly may negatively impact performance of an aspect of the apparatus performance or efficiency. If the maintenance task is performed prior to the on-set point 504, the anomaly on-set may not be detectable yet. If the maintenance task is performed after the anomaly functional manifestation point 506, the anomaly may have already begun to negatively impact performance, efficiency, and/or function of the given component.

On-set point 504 and functional manifestation point 506 are influenced by a number of factors, such as, without limitation, operating environment, age of the fleet, configuration of the fleet, maintenance practice, nature and composition of the component, an environment surrounding the component, frequency of utilization of the component, as well as any other factors contributing to appearance of anomalies.

Graph 500 illustrates a mapping of each maintenance event to a scheduled maintenance task. The maintenance events that are mapped to maintenance tasks include maintenance events and maintenance tasks occurring during scheduled maintenance, as well as maintenance events and maintenance tasks occurring during un-scheduled line station maintenance. Evident anomalies are typically discovered during in-service un-scheduled maintenance. Maintenance event lifetimes are measures based on the nature of the events. Latent or potential anomalies are typically found during scheduled base maintenance. The lifetime of an evident anomaly may be measured at the time between two consecutive maintenance events. Latent anomalies are detected during scheduled base inspections and are assumed to occur between two consecutive scheduled maintenance inspections. In both cases, the lifetimes of the anomalies are plotted using appropriate statistical distribution function, such as, without limitation, a Weibull distribution.

Figure 6:
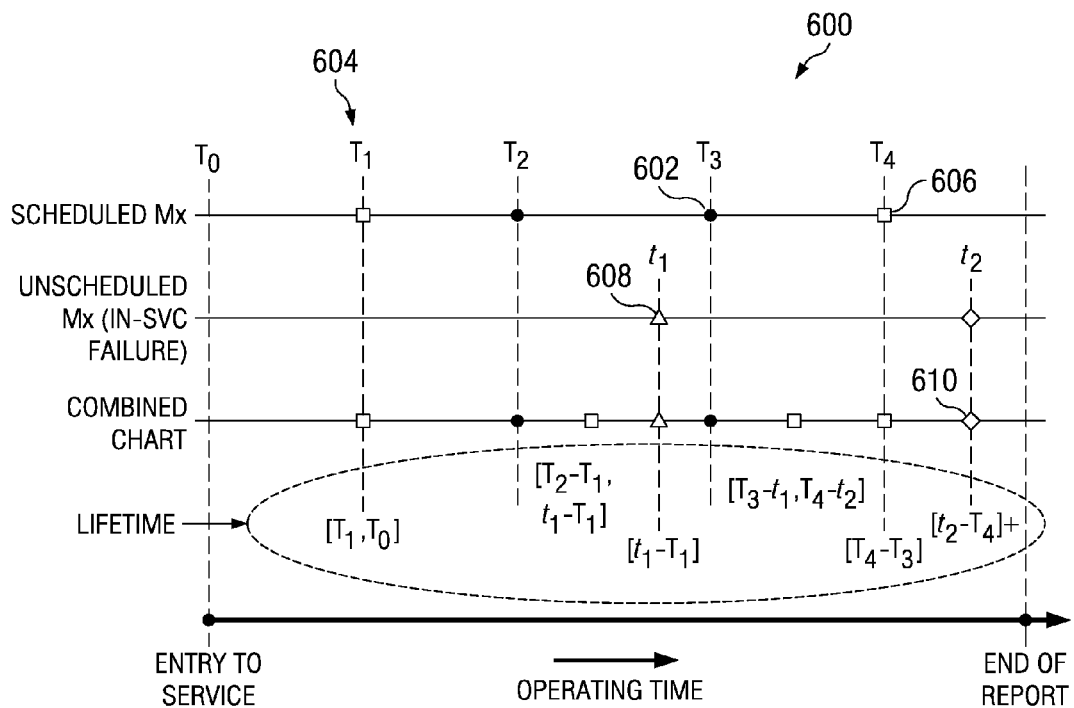
FIG. 6 is a graph illustrating maintenance event lifetimes in accordance with an advantageous embodiment.

FIG. 6 is a graph illustrating maintenance event lifetimes in accordance with an advantageous embodiment. Graph 600 shows a mapping of maintenance events for a given system or component in an apparatus based on the nature of the event.

Maintenance event 602 is a scheduled maintenance inspection with no anomalies detected. Maintenance event 604 is a scheduled maintenance event in which a potential latent anomaly is detected. Maintenance event 606 is a scheduled maintenance inspection result in which a manifested anomaly is found. Maintenance event 608 is an un-scheduled in-service maintenance event in which an anomaly, such as a loss of function, manifested. Maintenance event 610 is an un-scheduled in-service maintenance event in which a component or sub-component was removed without any detection of an anomaly or failure.

Figure 7:
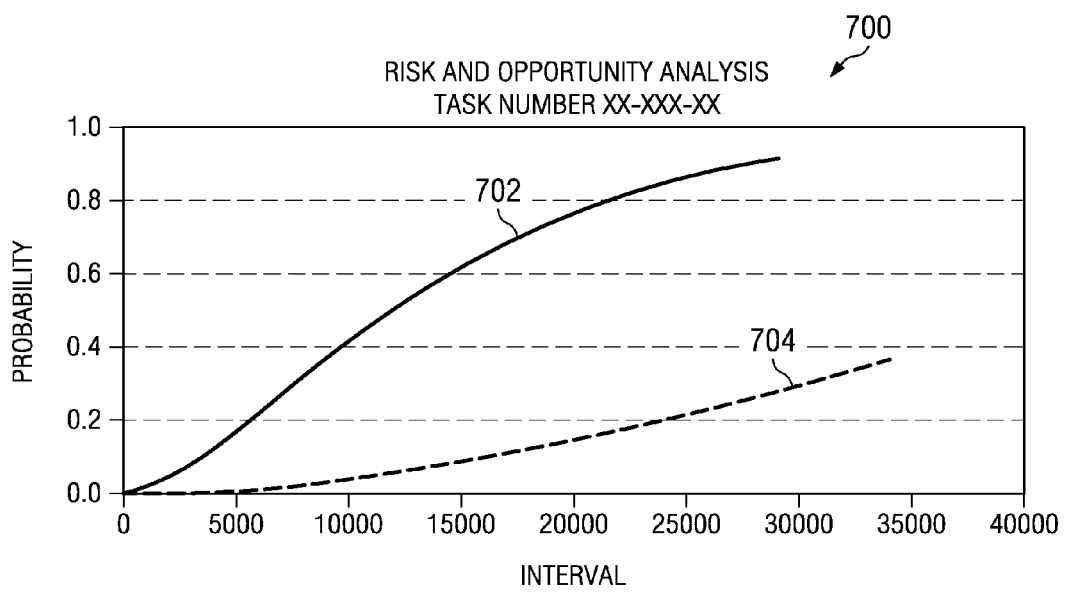
FIG. 7 is a graph illustrating a maintenance event probability distribution in accordance with an advantageous embodiment.

FIG. 7 is a graph illustrating a maintenance event probability distribution in accordance with an advantageous embodiment. Graph 700 is a maintenance event probability distribution generated by a statistical analysis engine, such as statistical analysis engine 314 in FIG. 3. Line 702 shows scheduled maintenance findings and line 704 shows un-scheduled in-service maintenance finding. As can be seen, as the interval between scheduled maintenance tasks increases, the occurrence of un-scheduled in-service maintenance events also increases. In other words, when out-of-service scheduled maintenance is not performed frequently enough, the frequency of necessary in-service maintenance increases.

Figure 8:
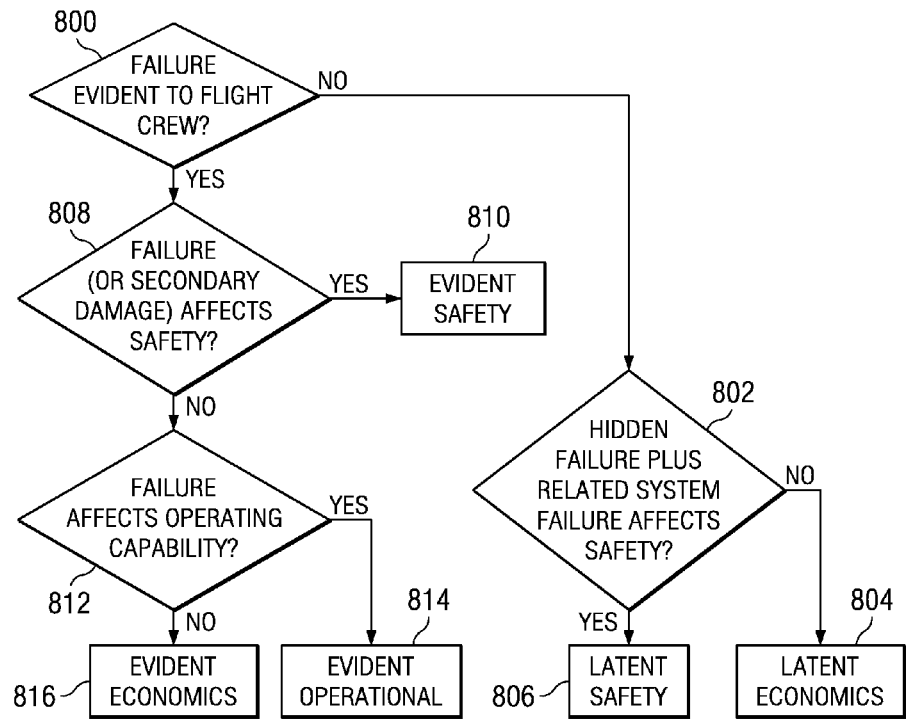
FIG. 8 is a block diagram of system task classifications in accordance with an advantageous embodiment.

FIG. 8 is a block diagram of technical anomaly classifications in accordance with an advantageous embodiment. Anomalies may be classified in accordance with MSG-3 failure effect category or any other classification system. In this example, if an anomaly is not evident to the flight crew or operator 800, the anomaly is not hidden and/or the anomaly does not affect safety of a related system 802, the anomaly is classified as a latent economic 804 anomaly. A latent economic task anomaly is not evident to operators and does not have safety implications for the apparatus. A primary latent failure coupled with an additional anomaly or failure does not have an adverse safety impact. However, the primary latent failure may result in costly maintenance action if not addressed in due time.

If an anomaly is not evident to the flight crew or operator 800, the anomaly is hidden, and a related system anomaly affects safety 802, the anomaly is classified as a latent safety 806 anomaly. A latent safety anomaly is not evident to operators of the apparatus and such an anomaly, in combination with one additional anomaly or failure of a backup system, may have an adverse impact on operational safety. Therefore, latent safety maintenance task intervals are selected to minimize the risk of multiple latent anomalies or exposure time.

If an anomaly is evident to the flight crew 800 and the anomaly affects safety 808, the anomaly is an evident safety 810 task. By definition, a failure or an event related to an evident safety task category is evident to the operator of the apparatus may have an immediate impact on the operational safety of the apparatus. For example, a failure with the braking system of an automobile is an evident safety task that affects the safety of the automobile. The maintenance interval is determined in such a way as to avoid and/or minimize the risk of failures during operation. For evident safety tasks, the risk of in-service event is limited to a certain level.

If the anomaly is evident to the flight crew 800, the anomaly does not affect safety 808, but the anomaly does affect operating capability 812, then the anomaly is an evident operational task 814. Anomalies in the evident operation task category are evident to operators of the apparatus but do not affect operational safety. However, such anomalies may restrict operational capability of the apparatus. For example, if the apparatus is an aircraft, an evident operational task anomaly may restrict an aircraft payload and/or range capability; or the anomaly may require immediate fix before further operation of the aircraft causing flight delay or cancellations.

If the anomaly is evident to the flight crew 800, the anomaly does not affect safety 808, and the anomaly does not affect operating capability 812, then the anomaly is an evident economics 816 anomaly. These evident economic anomalies are evident to operators with no safety or operational impact on the apparatus. However, the evident economic anomaly may result in costly maintenance action unless corrected in due time.

For operational tasks, the maintenance interval is determined based on the level of operational impact, that is, minimize the risk of in-service events to acceptable levels. Risk assessment together with economic analysis is used for this purpose.

Figure 9:
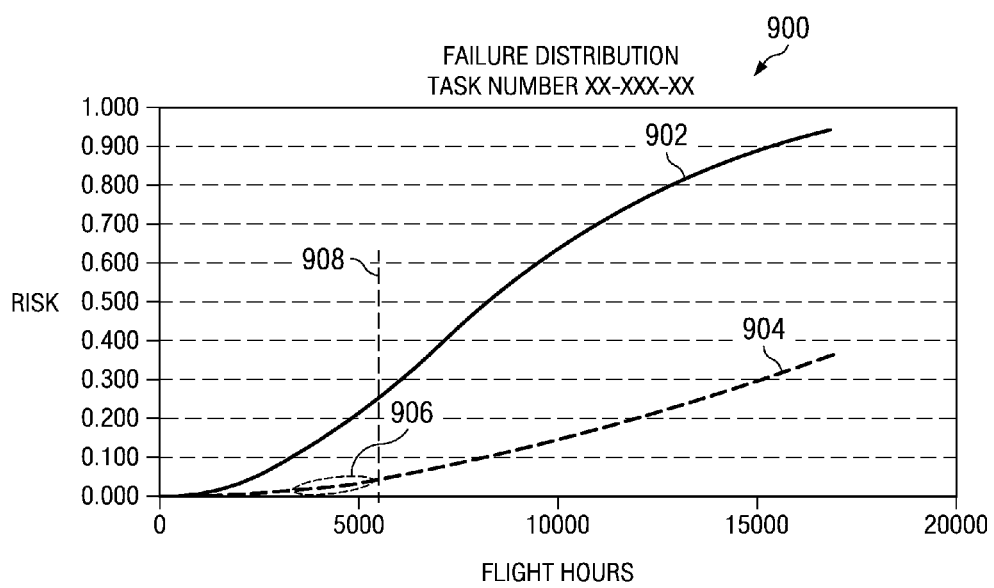
FIG. 9 is a graph showing a safety task interval analysis in accordance with an advantageous embodiment.

Referring now to FIG. 9, a graph showing a safety task interval analysis is shown in accordance with an advantageous embodiment. Graph 900 shows an example of a risk analysis profile for evident safety task across a time interval (t). Line 902 shows risks of scheduled task findings occurring across various time intervals. Line 904 shows a distribution of risks for in-service anomalies occurring across various time intervals. Interval 906 is a safe interval zone for minimizing the risk of in-service events to an acceptable or optimized level. In this example, point 908 is a threshold or cut-off point for performing scheduled maintenance to prevent or minimize in-service maintenance events.

For economic tasks, the cost of the scheduled maintenance versus the cost of in-service failure is evaluated to identify optimum intervals. In one embodiment, the cost of a routine task includes, without limitation, the cost of access, inspection, close up, and testing. The cost of a routine task is a fixed cost for every scheduled task. The cost of a non-routine task may include, without limitation, labor and material costs to make any necessary repairs or replacements. Non-routine task costs are variable based on the risk of having a latent anomaly at a given interval. The cost of in-service corrective action is similar to non-routine maintenance costs. However, in most cases, an in-service anomaly may cost more than scheduled task finding. The cost of in-service delay or cancellation including, but not limited to, the ground time required to fix the anomaly, is also considered. The cost of delay is calculated as a function of delay time. For a scheduled task finding distribution function Fs(t) and in-service anomaly distribution Fi(t), the cost of a scheduled task for a given interval (t) is as follows:

Cost for interval (t)=(R+NFs(t)), where R represents the cost of routine task and "N" represents the cost of non-routine task.

The cost of an in-service anomaly for a given time interval (t) is also calculated as follows:

Cost for interval (t)=(U+D)Fi(t), where "U" represents the cost of unscheduled in-service maintenance and "D" represents the cost of operational disruptions, including, but not limited to, delays and cancellations.

Figure 10:
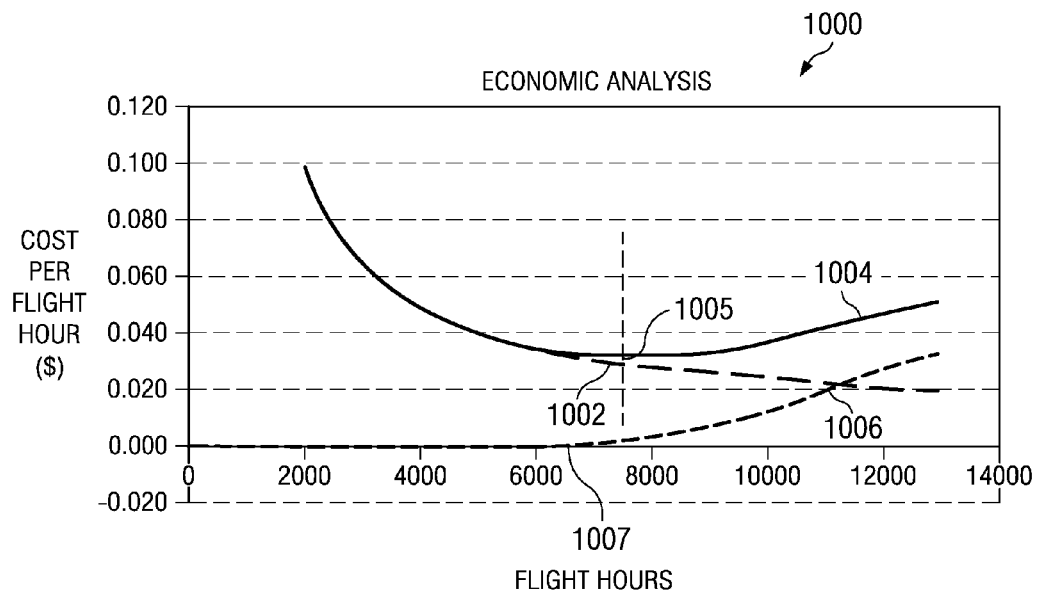
FIG. 10 is a graph illustrating an economic task interval analysis in accordance with an advantageous embodiment.

FIG. 10 is a graph illustrating an economic task interval analysis in accordance with an advantageous embodiment. Graph 1000 shows a cost distribution for economic tasks. Line 1002 shows scheduled task cost over time. Line 1006 shows a distribution of in-service anomaly costs. Line 1004 shows the total cost of both scheduled task costs and in-service maintenance costs. The minimum cost 1005 is used to determine the cost-effective interval 1007.

Figure 11:
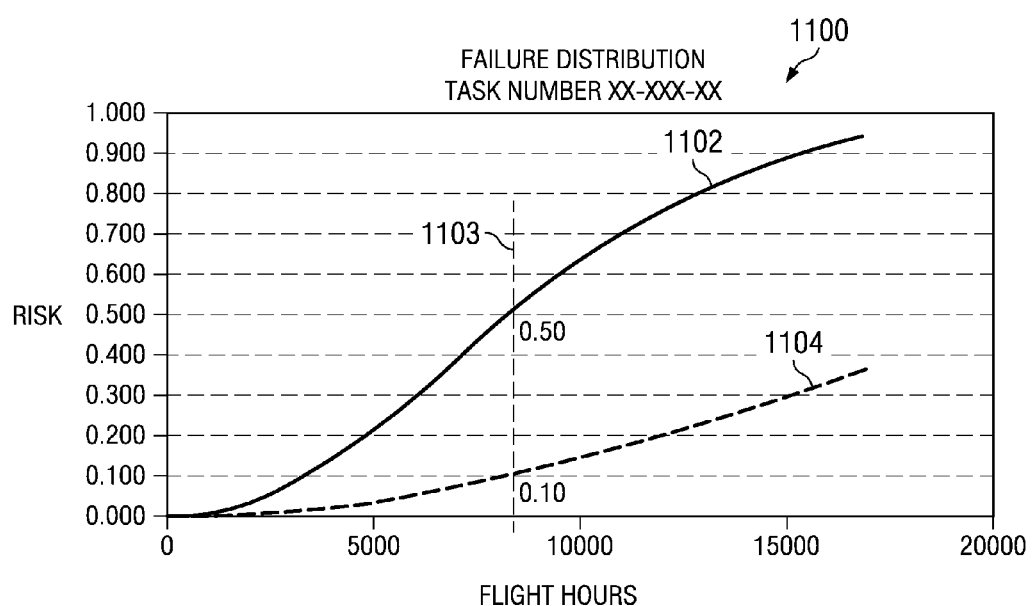
FIG. 11 is a graph illustrating an optimum interval for economic maintenance tasks in accordance with an advantageous embodiment.

Turning now to FIG. 11, a graph illustrating an optimum interval for economic maintenance tasks is depicted in accordance with an advantageous embodiment. Graph 1100 shows a distribution of economic tasks. Line 1102 shows an opportunity distribution over time for scheduled maintenance task findings. Line 1104 shows a risk distribution over time for unscheduled in-service anomalies. Line 1103 shows the chance of capturing defect during schedule maintenance versus the risk of in-service anomaly. In this example, the cost-effective interval captures up to fifty percent (50%) of anomalies while risking less than ten percent (10%) in-service anomalies. Evident economic anomalies may result in costly maintenance action if they are not identified and corrected in a timely manner. Graph 1100 is used to identify the optimum interval that minimizes the overall maintenance costs. In some cases, economic data may not be available. Therefore, the statistical analysis engine may also determine the optimum interval based on the risk level of anomalies being detected and/or manifesting while the apparatus is in-service.

Figure 12:
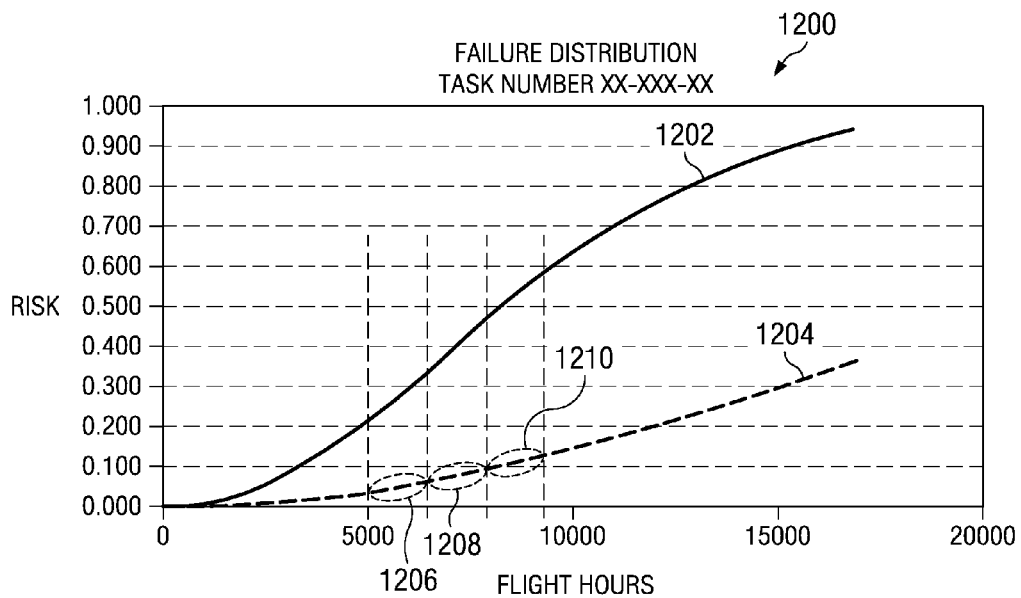
FIG. 12 is a graph illustrating a maintenance task distribution chart in accordance with an advantageous embodiment.

Turning now to FIG. 12, a graph illustrating a maintenance task distribution chart is shown in accordance with an advantageous embodiment. Graph 1200 illustrates a distribution chart and safe interval zones for evident anomalies. Line 1202 shows a distribution of risk over time for scheduled maintenance task findings. Line 1204 shows a risk distribution over time for in-service anomalies. Interval 1206 is a safe interval zone for a safety task. Interval 1208 is a safe interval zone for an operational task. Interval 1210 is a safe interval zone for an economic task.

Latent safety anomalies are not evident to operators of an apparatus and such anomalies in combination with one additional system failure or a backup function may have an adverse affect on operational safety. For example, and without limitation, the second failure may be related to a redundant system or an event that is normally prevented and/or detected by the system experiencing the latent anomaly. As another example, a latent fire detection system anomaly followed by a fire event may result in an adverse affect on safety.

Figure 13:
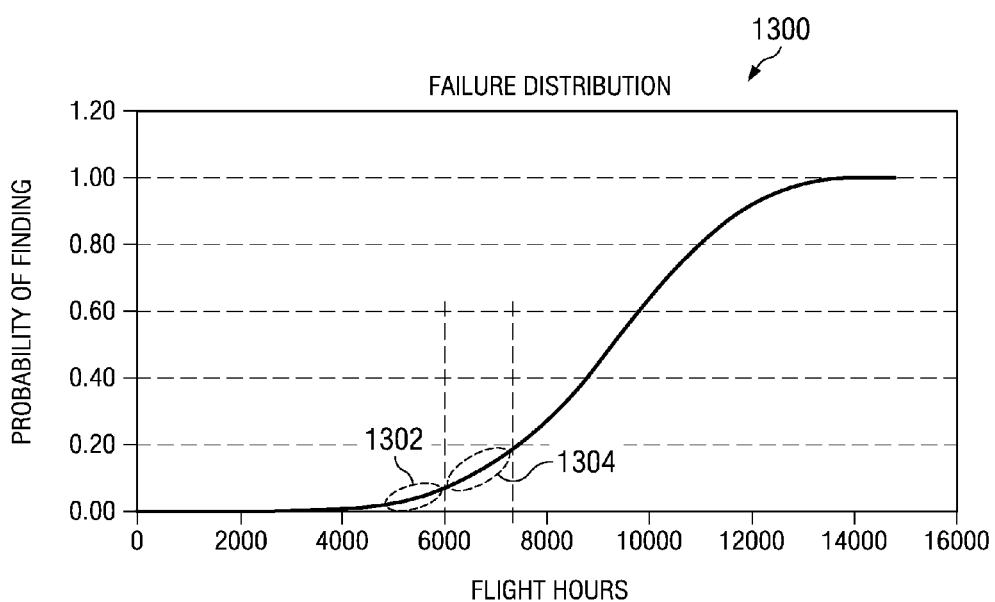
FIG. 13 is a graph illustrating interval zones for latent maintenance tasks in accordance with an advantageous embodiment.

FIG. 13 is a graph illustrating interval zones for latent maintenance tasks in accordance with an advantageous embodiment. Graph 1300 shows a safe interval zone for a latent task. Interval 1302 is an interval zone for latent safety anomalies. Interval 1304 is an interval zone for latent economic anomalies. Latent task maintenance intervals are intervals that minimize the risk of latent anomaly exposure time. The statistical analysis engine may use an economic analysis or a risk distribution chart, such as graph 1300, to identify optimized maintenance intervals for latent economic anomalies.

Corrosion tasks are maintenance tasks that preserve and restore the inherent corrosion preventive measures and structural surface finishes. Corrosion findings may have a level zero (0) indicating no corrosion is detected during maintenance; a level one (1) indicating that the component can be reworked and/or blended-out; level two (2) indicating that the component may require repair, reinforcement, or replacement; and level three (3) indicating that the component is severely damaged and maintenance is a high priority.

The statistical analysis for scheduled maintenance optimization adjusts the scheduled maintenance based on corrosion findings during in-service and out-of-service to adjust scheduled maintenance intervals to ensure detection of corrosion at or prior to level one.

Figure 14:
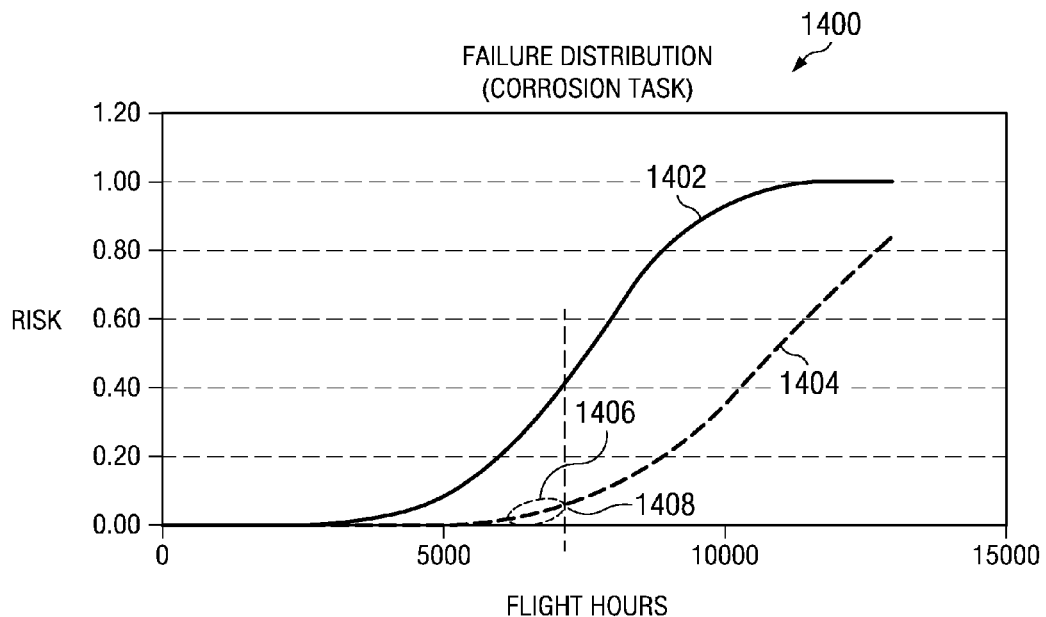
FIG. 14 is a graph illustrating interval zones for corrosion preventative tasks in accordance with an advantageous embodiment.

FIG. 14 is a graph illustrating interval zones for corrosion preventative tasks in accordance with an advantageous embodiment. Graph 1400 shows a statistical distribution of risk for corrosion detection maintenance tasks. Line 1402 is a distribution of level one anomaly detection over time. Line 1404 is a distribution of levels two and three anomaly detection. Interval 1406 is a safe interval zone. Point 1408 is a cut-off point to avoid manifestation of anomalies at levels greater than level one. The statistical distribution of each anomaly level is analyzed by the statistical analysis for scheduled maintenance optimization to identify inspection intervals, such as interval 1406, that keeps anomaly levels at level zero or level one.

In this example, graph 1400 is generated based on maintenance data for anomalies at levels zero to level two. However, in some cases, there may be insufficient maintenance data for level two anomalies due to a lack of any level two or level three anomalies occurring. In such cases, the safe interval zone is identified using the level zero and level one anomaly data only.

Structural maintenance tasks are maintenance tasks associated with maintaining the structure of the apparatus. Structural maintenance tasks may be analyzed the same way as latent safety tasks. In one embodiment, reliability engineers also evaluate the structural maintenance events and validate the optimal scheduled maintenance intervals identified by the statistical analysis for scheduled maintenance optimization engine.

In one embodiment, corrosion tasks and structural tasks are integrated. In such a case, the maintenance interval identified for corrosion tasks and the maintenance interval identified for the structural tasks are compared and the shortest interval is selected as the optimal overall interval.

Figure 15:
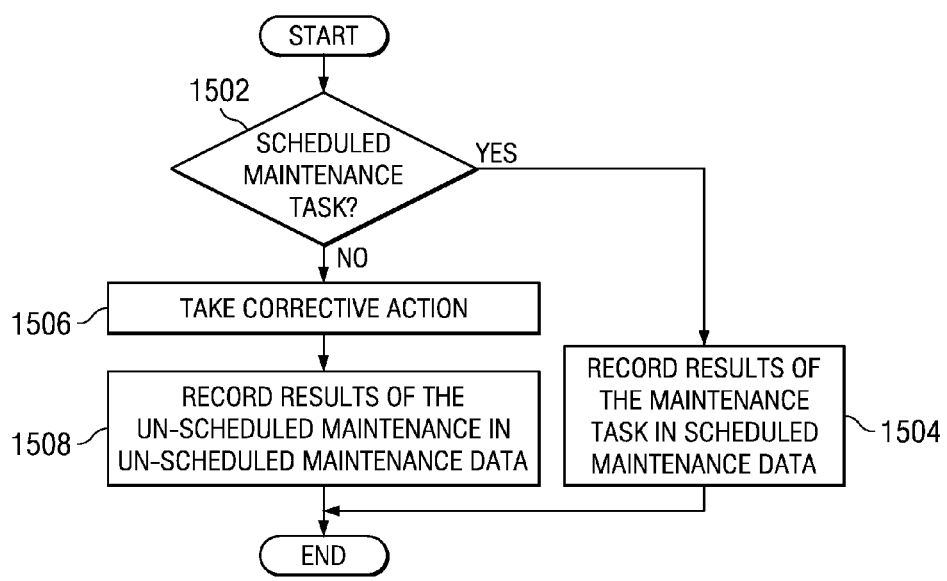
FIG. 15 is a flowchart illustrating a process for creating a maintenance history in accordance with an advantageous embodiment.

Referring now to FIG. 15, a flowchart illustrating a process for creating a maintenance history is shown in accordance with an advantageous embodiment. The process in FIG. 15 may be performed by operators of a given apparatus. The process begins by determining whether a scheduled maintenance task occurs (operation 1502). If the scheduled maintenance task did occur, the operator records the results of the maintenance task in a scheduled maintenance data (operation 1504) with the process terminating thereafter.

Returning to operation 1502, if the maintenance task is not a scheduled task, the operator takes corrective action (operation 1506). The corrective action is an un-scheduled in-service maintenance task. The operator then records the result of the un-scheduled maintenance task in un-scheduled maintenance data (operation 1508) with the process terminating thereafter.

Figure 16:
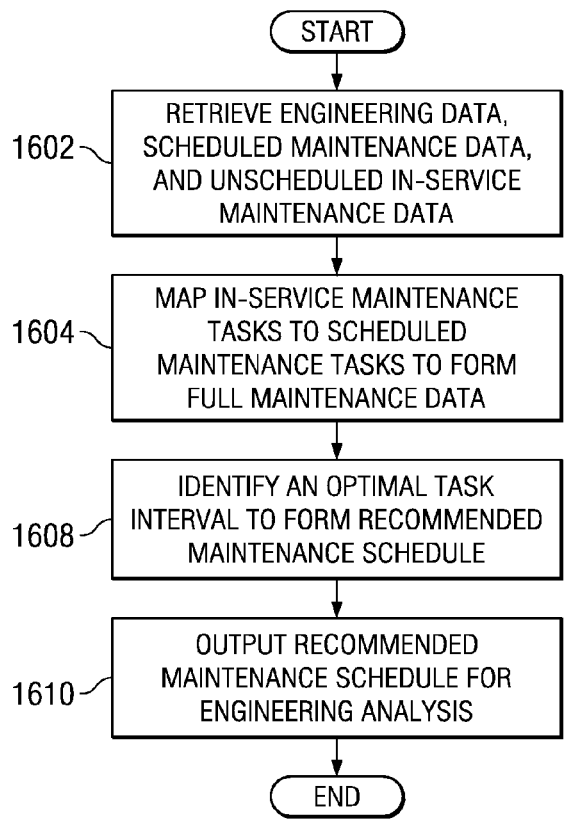
FIG. 16 is a flowchart illustrating a process for generating an optimized maintenance schedule in accordance with an advantageous embodiment.

FIG. 16 is a flowchart illustrating a process for generating an optimized maintenance schedule in accordance with an advantageous embodiment. The process in FIG. 16 is implemented by software for performing statistical analysis using in-service and out-of-service maintenance data for an apparatus, such as SASMO 302 in FIG. 3. The process begins by retrieving engineering data, scheduled maintenance data, and un-scheduled in-service maintenance data for the apparatus (operation 1602). The process maps in-service maintenance tasks to scheduled maintenance tasks to form mapped maintenance data (operation 1604). The process identifies an optimal task interval to form a recommended maintenance interval (operation 1608). The process outputs a recommended maintenance interval for engineering analysis (operation 1610) with the process terminating thereafter.

An embodiment of the present disclosure provides a computer implemented method, apparatus, and computer program product for identifying an interval for performing a maintenance task. The process retrieves scheduled maintenance data and unscheduled in-service maintenance data for a given apparatus type. The process maps the un-scheduled in-service maintenance data to the scheduled maintenance data for the given apparatus type to form mapped maintenance data. The process performs a statistical analysis on the mapped maintenance data. The process identifies an optimal interval for performing the maintenance task based on a result of the statistical analysis to form a recommended maintenance interval.

The statistical analysis for scheduled maintenance optimization provides a scientific and automated method to identify optimization opportunities for scheduled maintenance requirements based on relevant and consistent maintenance data representing a specific fleet model. The statistical analysis for scheduled maintenance optimization performs analysis based on structured and formatted data and all relevant airplane scheduled and un-scheduled maintenance data to identify the most beneficial time to perform scheduled maintenance. This statistical analysis on in-service maintenance events, in addition to scheduled maintenance events, minimizes the frequency of in-service maintenance events and improves aircraft dispatch reliability by optimizing scheduling of preventative scheduled maintenance tasks while minimizing the occurrence of un-scheduled in-service maintenance tasks.

In addition, the statistical analysis scheduled maintenance optimization engine minimizes engineering resources required for manual program analysis. The statistical analysis scheduled maintenance optimization engine reduces leadtime for program update and recommended changes. The statistical analysis scheduled maintenance optimization engine provides engineers with an efficient trend and root cause analysis tool and centralized access to all relevant maintenance operational and engineering data. The statistical analysis scheduled maintenance optimization engine supports engineers in recommending the most efficient maintenance programs based on real time maintenance data and scientific analysis. The statistical analysis scheduled maintenance optimization engine reduces costs incurred by non-value added maintenance tasks and unavailability of aircraft due to in-service maintenance.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communication link may use a medium that is, for example without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method of identifying an interval for performing a maintenance task, the method comprising:
retrieving, by one or more processors, scheduled maintenance data and un-scheduled in-service maintenance data for a given apparatus type;
mapping, by the one or more processors, the un-scheduled in-service maintenance data to the scheduled maintenance data for the given apparatus type to form mapped maintenance data, wherein mapping includes using a dictionary of technical vocabulary used in a global maintenance industry and a text mining tool that maps log book entries, cancellation records, and delay records in the scheduled maintenance data and the un-scheduled in-service maintenance data to form the mapped maintenance data;
performing a statistical analysis on the mapped maintenance data; and
identifying an optimal interval for performing the maintenance task based on a result of the statistical analysis to form a recommended maintenance interval.

2. The computer implemented method of claim 1 wherein the maintenance task is associated with a set of components in an apparatus of the given apparatus type, and wherein the optimal interval is an interval of time between performances of the maintenance task that minimizes occurrences of un-scheduled in-service maintenance associated with the set of components while taking into account safe interval zones, evident safety tasks, evident economic anomalies, evident operational tasks, latent safety anomalies and latent economic anomalies.

3. The computer implemented method of claim 1 further comprising:
outputting the recommended maintenance interval to a set of engineers, wherein the set of engineers utilize the recommended maintenance interval to generate the recommended maintenance schedule for an apparatus of the given apparatus type.

4. The computer implemented method of claim 1 further comprising:
retrieving engineering data for the given apparatus type; and
mapping the engineering data to the scheduled maintenance data and the un-scheduled in-service maintenance data to form the mapped maintenance data.

5. The computer implemented method of claim 1 wherein the scheduled maintenance data and the un-scheduled in-service maintenance data is generated by a set of operators.

6. The computer implemented method of claim 1 wherein the mapped maintenance data is structured and formatted data, and wherein the mapped maintenance data comprises data describing in-service performance of an apparatus of the given apparatus type.

7. The computer implemented method of claim 1 wherein the mapped maintenance data comprises data describing scheduled maintenance history and in-service performance of an aircraft, and wherein the given apparatus type is an aircraft model.

8. The computer implemented method of claim 1 wherein the maintenance task is associated with a set of components in an apparatus of the given apparatus type, and wherein the optimal interval is an interval of time between performances of the maintenance task that maximizes a probability that anomalies associated with the set of components are detected during preventive scheduled maintenance.

9. A computer program product for identifying an interval for performing a maintenance task, the computer program product comprising:
a non-transitory computer-usable medium having computer-usable program code embodied therewith, the computer-usable program code comprising:
computer-usable program code configured to retrieve scheduled maintenance data and un-scheduled in-service maintenance data for a given apparatus type;
computer-usable program code configured to map the un-scheduled in-service maintenance data to the scheduled maintenance data for the given apparatus type to form mapped maintenance data, wherein mapping includes using a dictionary of technical vocabulary used in a global maintenance industry and a text mining tool that maps log book entries, cancellation records, and delay records in the scheduled maintenance data and the un-scheduled in-service maintenance data to form the mapped maintenance data;
computer-usable program code configured to perform a statistical analysis on the mapped maintenance data; and
computer-usable program code configured to identify an optimal interval for performing the maintenance task based on a result of the statistical analysis to form a recommended maintenance interval.

10. The computer program product of claim 9 wherein the maintenance task is associated with a set of components in an apparatus of the given apparatus type, and wherein the optimal interval is an interval of time between performances of the maintenance task that minimizes occurrences of un-scheduled in-service maintenance associated with the set of components while taking into account safe interval zones, evident safety tasks, evident economic anomalies, evident operational tasks, latent safety anomalies and latent economic anomalies.

11. The computer program product of claim 9 further comprising:
computer-usable program code configured to output the recommended maintenance interval to a set of engineers, wherein the set of engineers utilize the recommended maintenance interval to generate a recommended maintenance schedule for an apparatus of the given apparatus type.

12. The computer program product of claim 9 further comprising:
computer-usable program code configured to retrieve engineering data for the given apparatus type; and
computer-usable program code configured to map the engineering data to the scheduled maintenance data and the un-scheduled in-service maintenance data to form the mapped maintenance data.

13. The computer program product of claim 9 wherein the mapped maintenance data is structured and formatted data, and wherein the mapped maintenance data comprises data describing in-service performance of an apparatus of the given apparatus type.

14. The computer program product of claim 9 wherein the mapped maintenance data comprises data describing scheduled maintenance history and in-service performance of an aircraft, and wherein the given apparatus type is an aircraft model.

15. The computer program product of claim 9 wherein the maintenance task is associated with a set of components in an apparatus of the given apparatus type, and wherein the optimal interval is an interval of time between performances of the maintenance task that maximizes a probability that anomalies associated with the set of components are detected during preventive scheduled maintenance.

16. An apparatus comprising:
a bus system;
a communications system coupled to the bus system;
a memory connected to the bus system, wherein the memory includes computer usable program code; and
a processing unit coupled to the bus system, wherein the processing unit executes the computer-usable program code to retrieve scheduled maintenance data and un-scheduled in-service maintenance data for a given apparatus type; map the un-scheduled in-service maintenance data to the scheduled maintenance data for the given apparatus type to form mapped maintenance data, wherein mapping includes using a dictionary of technical vocabulary used in a global maintenance industry and a text mining tool that maps log book entries, cancellation records, and delay records in the scheduled maintenance data and the un-scheduled in-service maintenance data to form the mapped maintenance data; perform a statistical analysis on the mapped maintenance data; and identify an optimal interval for performing the maintenance task based on a result of the statistical analysis to form a recommended maintenance interval.

17. The apparatus of claim 16 wherein the processor unit further executes the computer-usable program code to output the recommended maintenance interval to a set of engineers, wherein the set of engineers utilize the recommended maintenance interval to generate a recommended maintenance schedule for an apparatus of the given apparatus type while taking into account safe interval zones, evident safety tasks, evident economic anomalies, evident operational tasks, latent safety anomalies and latent economic anomalies.

18. The apparatus of claim 16 wherein the maintenance task is associated with a set of components in an apparatus of the given apparatus type, wherein the optimal interval is an interval of time between performances of the maintenance task that minimizes occurrences of un-scheduled in-service maintenance associated with the set of components, and wherein the optimal interval is an interval of time between performances of the maintenance task that maximizes a probability that anomalies associated with the set of components are detected during preventive scheduled maintenance.

19. The apparatus of claim 16 wherein the processor unit further executes the computer-usable program code to retrieve engineering data for the given apparatus type; and map the engineering data to the scheduled maintenance data and the un-scheduled in-service maintenance data to form the mapped maintenance data.

20. The apparatus of claim 16 wherein the mapped maintenance data comprises data describing scheduled maintenance history and in-service performance of an aircraft, and wherein the given apparatus type is an aircraft model.

* * * * *

UNITED STATES PATENT AND TRADEMARK OFFICE
CERTIFICATE OF CORRECTION

PATENT NO. : 8,117,007 B2
APPLICATION NO. : 12/209491
DATED : February 14, 2012
INVENTOR(S) : Anbessie A. Yitbarek et al.

It is certified that error appears in the above-identified patent and that said Letters Patent is hereby corrected as shown below:

Title page item (75) Inventors:

Please remove "Dopulatshahi" and insert --Doulatshahi--

Signed and Sealed this
Twenty-fourth Day of April, 2012

David J. Kappos
*Director of the United States Patent and Trademark Office*